United States Patent [19]
Wheatley

[11] 3,974,848
[45] Aug. 17, 1976

[54] THREE PORT TWO WAY CHECK VALVE
[76] Inventor: Thomas Wheatley, 3717 Pinemont, Houston, Tex. 77018
[22] Filed: May 16, 1975
[21] Appl. No.: 578,257

[52] U.S. Cl. .............................. 137/102; 137/513; 137/527
[51] Int. Cl.² ........................................ F16K 15/03
[58] Field of Search ........... 137/102, 107, 218, 513, 137/527.8

[56] References Cited
UNITED STATES PATENTS

| | | | |
|---|---|---|---|
| 878,239 | 2/1908 | Rubach | 137/513 X |
| 1,553,940 | 9/1925 | Kangieser | 137/513 X |
| 2,711,188 | 6/1955 | Nickerson | 137/527.8 |
| 2,925,825 | 2/1960 | Staiger | 137/527.8 X |
| 3,202,165 | 8/1965 | Yavicoli | 137/107 |
| 3,394,731 | 7/1968 | Elliott | 137/527.8 |

FOREIGN PATENTS OR APPLICATIONS
708,139  4/1954  United Kingdom ................ 137/102

Primary Examiner—Robert G. Nilson

[57] ABSTRACT

A three port, two way check valve is disclosed. It is made of a standard tee and standard flanges attached thereto, typically in conformance with API standards. A flat disc is inserted in one of the openings, the disc incorporating an internal circular valve seat and a hinged valve member which closes against the disc. A similar apparatus is installed in the center port of the tee. The flapper valve elements are connected together by a connecting rod. The connecting rod assures that when one is pulled closed that the other is pulled open. The connecting rod assures that the check valve function is obtained.

4 Claims, 2 Drawing Figures

THREE PORT TWO WAY CHECK VALVE

BACKGROUND OF THE INVENTION

It is sometimes necessary to install a three port two way check valve. One exemplary problem often occurs at storage tanks and oil fields. To set the background, several wells will be connected through gathering lines to a storage tank. The wells will flow into the storage tank through a common line. The tank will be filled and emptied through the common line. A pump will be installed in the common line, normally arranged to pump from the tank back into the common line when the tank is emptied. Thus, it becomes necessary to have bidirectional flow in the common line. Most pumps however cannot permit flow in both directions through the pump even when the pump is de-energized. The valve of the present invention is particularly useful in protecting the pump against reverse flow through it. Pumps of the impeller type, for instance, can only pump in one direction. They do not enable flow in the opposite direction even under a no-power condition. Thus, the three port two way check valve of the present invention is wisely installed downstream from the pump and a bypass line around the pump connects upstream of the pump. This enables the pump to operate in the intended fashion when it is powered. This enables flow in the opposite direction past the pump without damaging the pump.

Other circumstances can be imagined where a three port two way check valve is most helpful. The apparatus of the present invention is particularly adapted for use in such circumstances. The valve of the present invention is especially economical in comparison with valves known in the prior art. This valve is relatively inexpensive to manufacture. The cost of manufacture is reduced by using a standard fabricated tee of the necessary size. The tee is adapted to connection to the three pipe lines by welding standard flange plates to it, typically those in accordance with API standards. This assembles the entire body of the apparatus. Moreover, a valve assembly is installed in two of the three ports. One is installed in the center port and a second valve element is installed in one of the two remaining ports. The valve assembly preferably includes an encircling valve seat and a valve element which is hinged to the seat. Fluid flow in one direction forces the valve element open, swinging about the hinge. Fluid flow in the opposite direction of course closes the valve element against the seat thereby providing the check valve function. The present invention uniquely provides the assurance that one valve member is closed when the other is open so that the check valve function is correctly observed.

SUMMARY OF THE PRESENT INVENTION

This apparatus as a three port two way check valve. It is uniquely fabricated in an inexpensive manner by use of a standard tee. The tee has appended at each of the three ports an API standard flange. This enables connection with a pipe line. In the center port and on of the two adjacent ports a valve member is installed within the tee. The valve member includes a flat ring-like member which is axially open having an encircling valve seat. A valve element suspended by a hinge anchored in the ring-like member is snuggly received in the valve seat to close the valve. Since the two valve members are installed at right angles to one another, they are preferably positioned so that the hinges are closer to one another. A connective member extends from one valve element to another. It is of such a length that when one valve element is closed the other is pulled to a full open position by the connective link which is pivotly joined to them.

DESCRIPTION OF THE PREFERRED EMBODIMENT

Figure 1:
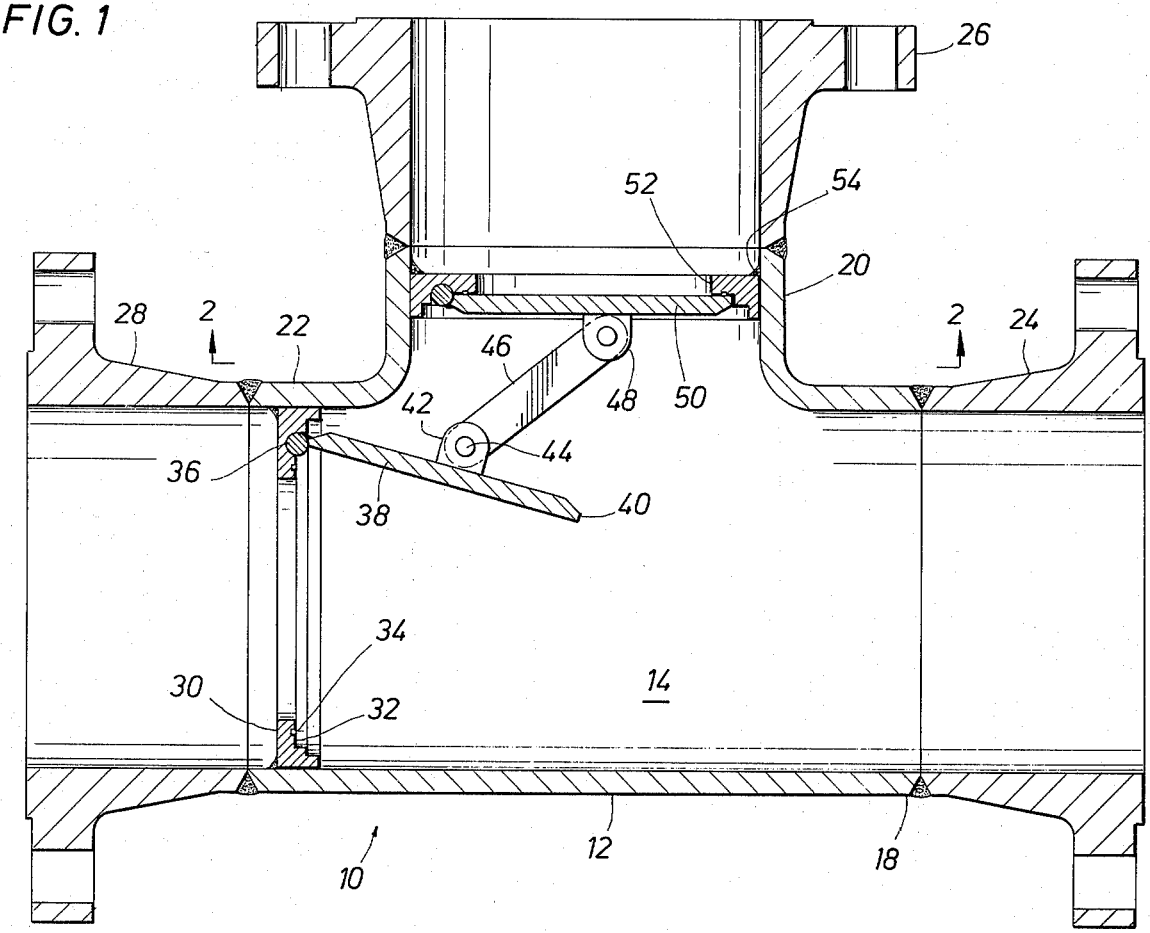
FIG. 1 is a sectional view through a three port two way check valve in accordance with the teachings of the present invention illustrating one port opened and the other closed.
Figure 2:
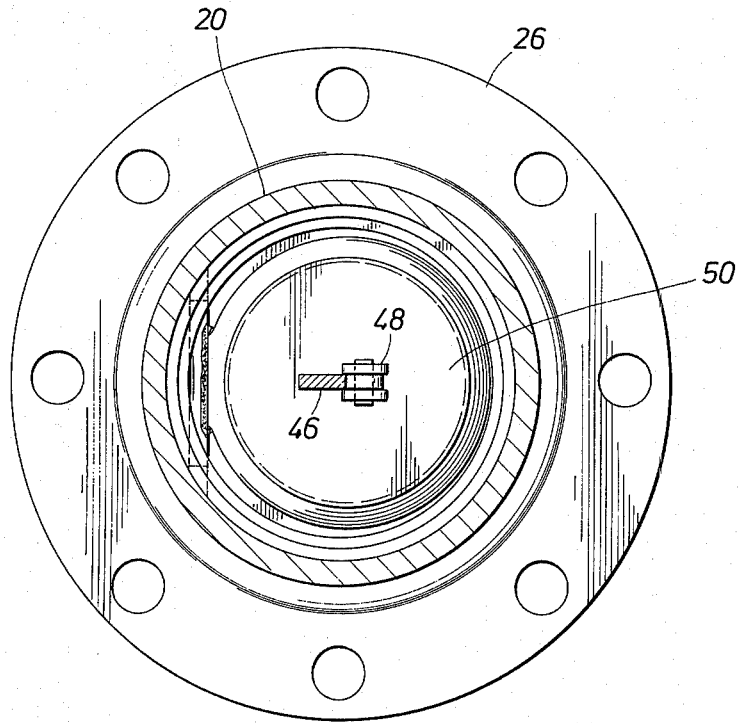
FIG. 2 is a sectional view along the line 2—2 showing details of the construction of the valve element and the hinge.

In the drawings, the numeral 10 identifies the three port two way check valve of the present invention. It is formed on a conventional tee body 12. The tee body encloses an internal passage 14 which connects the right and left ports. A center port connects at a right angle. The right hand port 18 is preferably the same diameter as the left hand port 22 while the port 20 positioned between them can be the same diameter or somewhat smaller as desired. The right hand port 18 is butt welded to a standard API flange fitting 24. The fitting 24 enables the three port check valve to be placed in a pipe line by connection of the flange to a mating flange of the pipe line. The port 20 has a similar flange 26 welded to it. The left hand port also has a similar flange plate welded to it. All of the flange plates preferably present standard connective flanges for incorporation in a pipe line as desired.

Within the tee body 12, a valve assembly 30 is positioned. It is positioned at the left hand port. The valve assembly comprises an encircling ring-like member which fits within the tee body and is welded at a point transverse to the tee body. The circular body 30 has a facing shoulder 32 on the downstream side. The shoulder 32 is grooved at 34 to provide a slot for positioning an O-ring seal member. The body 30 is axially open to enable fluid to flow through the body proceeding from the left hand port towards the right hand port.

A hinge pin 36 passed through the body 30 at a tangent to the axial opening supports a valve element 38. The valve element 38 is generally circular except for a tab which appends it to the hinge 36. The hinge pin 36 is received in a transverse passage through the body 30. As desired, the ends of the transverse passage are preferably plugged as by welding to keep the pin 36 in the transverse passage. The valve element 38 is dimensioned to lay on the shoulder 32 and over the seal in the groove or slot 34 thereby providing a leak proof closure. When it is closed, there is no flow from the three port valve 10 outwardly through the left hand port. The valve element 38 has an encircling edge 40 which is sized to fit just within the shoulder 32.

The valve element 38 supports on its downstream face a pair of upstanding tabs 42 which are spaced apart from one another and which support a transverse pin 44 between the tabs. The pin 44 enables connection to a connective link 46. The link 46 extends toward a second and similar valve element 50 which is likewise provided with upstanding tabs 48 on its downstream side. The valve element 50 is similar to the valve element 38. It is received in a similar ring like member 52 which is welded in the central port of the tee 12. The valve element 50 prevents flow outwardly to the center port but enables flow inwardly through it. The ring like member 52 is welded at 54 to secure its position in the center port.

The connective link 46 closes one of the valve elements while pulling the other valve element to a full open position. It will be first observed that the two valve elements in their closed position are arranged at right angles to one another and moreover, that they have the hinge pins arranged parallel to one another at a minimum distance therebetween. So to speak, this enables the valves to open back to back if it where not for the presence of the connective link 46. The link 46 is sized to pull one of the valve elements fully open when the other is closed. It is illustrated with the center port closed. This of course pulls the left hand port open. The connective link 46 also serves as damper. This prevents slamming of the valve elements while they reverse position. While a single valve element might slam precipitously, the connection of a second valve element which is then being pulled open slows the movement of the first thereby damping the closing action without interferring with the sureness of closure. The damped movement avoids a slamming jar.

It will be observed that flow into the tee from the right hand port 18 will close the left hand port and open the center port. Flow from the left hand port moves the valve elements to the illustrated position. Thus, the two way check valve function is achieved by this apparatus which enables it to solve problems of the sort mentioned above.

The tee body is normally forged, fabricated or cast. It is normally welded to the flanges which can be optionally omitted to enable the tee body to be welded into the pipe line. In normal use, the movable valve element of the center port is slightly smaller than the valve element in the right or left port. This acts somewhat as a bias force (when exposed to pipeline pressure) which closes one of the two connected valve elements, and thereby avoiding a tendency to stall a partly closed position. The slight degree of difference in size can be accomodated in the fixed ring around the movable valve element.

The foregoing is directed to the preferred embodiment but the scope thereof is determined by the claims which follow.

I claim:

1. A three-port, two-way check valve, comprising:
 a tee body having three ports in planes located at right angles with respect to one another;
 a transverse valve seat in the center port of the three ports;
 a valve element in said valve seat;
 a hinge transversely positioned adjacent to said valve seat for pivotally mounting said valve element for opening and closing relative to said valve seat;
 a second transverse valve seat in one of the two remaining ports;
 a second valve element in said second valve seat;
 a second hinge positioned adjacent to said second valve seat for pivotally mounting said second valve element for opening and closing relative to said valve seat;
 said first and second hinges being parallel to one another and also being located on the side of their respective ports nearer to one another; and
 connective means connected to both of said valve elements which connective means conveys movement of one of said valve elements to the other to close one when the other is opened by fluid flow.

2. The apparatus of claim 1 wherein said valve elements are circular discs.

3. The apparatus of claim 2 including a seal means adapted to contact the periphery of said circular valve elements and said valve seat, therebeing a seal means associated with each of said valve elements.

4. The apparatus of claim 1 wherein said connective means is pivotally connected at each end to the back side of said valve elements.

* * * * *